United States Patent [19]

Phillips

[11] 4,033,064
[45] July 5, 1977

[54] MINNOW MOOCHER

[76] Inventor: Allan J. Phillips, 1928 Buenavista, Comox, British Columbia, Canada

[22] Filed: Oct. 28, 1975

[21] Appl. No.: 626,176

[52] U.S. Cl. .............................. 43/42.39; 43/42.48
[51] Int. Cl.² ...................................... A01K 85/00
[58] Field of Search .......... 43/42.39, 42.48, 42.53, 43/42.32, 42.33

[56] References Cited

UNITED STATES PATENTS

| | | |
|---|---|---|
| 2,587,264 | 2/1952 | Wood .............................. 43/42.33 |
| 2,817,922 | 12/1957 | Takeshita ..................... 43/42.39 X |
| 3,045,382 | 7/1962 | Watkins ........................ 43/42.39 X |
| 3,611,615 | 10/1971 | Field ............................ 43/42.48 X |
| 3,763,588 | 10/1973 | Foster ......................... 43/42.33 X |
| 3,898,758 | 8/1975 | Swanningson ..................... 43/42.48 |

Primary Examiner—Hugh R. Chamblee
Assistant Examiner—Daniel J. Leach
Attorney, Agent, or Firm—Eugene V. Mandel

[57] ABSTRACT

A fishing lure simulating a minnow comprising a slightly tapered symmetrical arcuate lead body cast about a stainless steel insert provided with holes.

4 Claims, 4 Drawing Figures

U.S. Patent     July 5, 1977     4,033,064
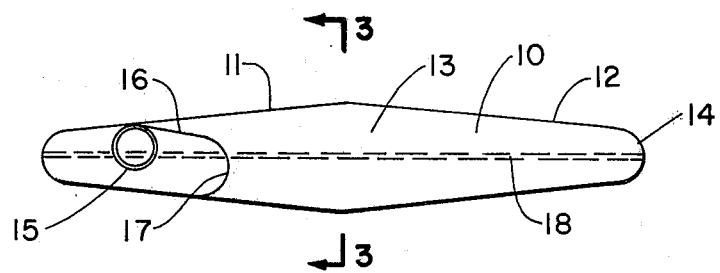
FIG. 1
FIG. 2
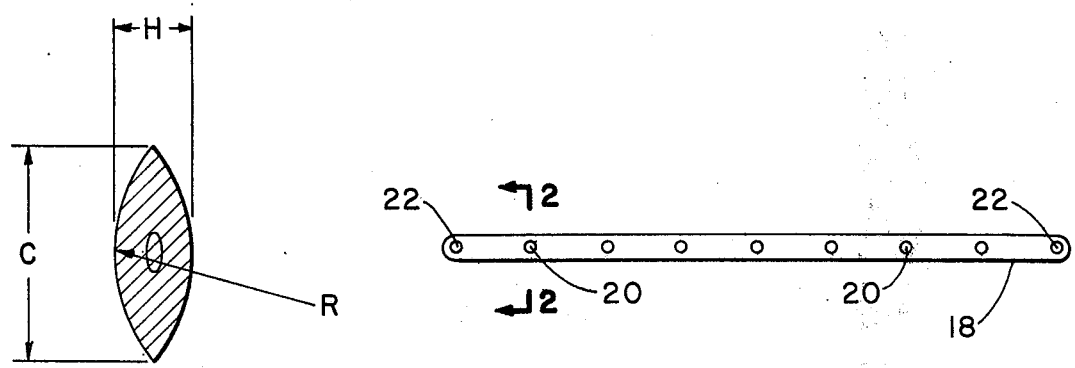
FIG. 3
FIG. 4

MINNOW MOOCHER

BACKGROUND OF THE INVENTION

This invention relates to fishing lures and, in particular, to minnow simulation. It also relates to methods of manufacture and assembly of fishing lures.

Man has so long eaten fish that attempts to attract the fish to bite are quite old. Natural and artificial bait has long been used. Some artificial lures are made to simulate specific fish.

The cost of lures is, of course, dependent upon the manufacturing process. The established method of easily connecting a line to a lure is to have holes in the lure. To have a free turning lure, either a line free turning in the lure, or an insert extending from the lure is required.

The traditional method of manufacturing has been to cast short holes and to drill long holes. Deep drilling is slow and expensive. Another method is desired.

A known method of creating the hole in the manufacture of cast lures is to put a wire through the center of the mould and pulled out as the cast material begins to harden. This is critical in the manufacturing process and, if not timed just right, the wire cannot be withdrawn to form the hole. If withdrawn too soon, the hole will close up behind the wire.

The object of this invention is to provide a fishing lure of improved design and construction. An important object of the invention is to provide a fishing lure which can be economically manufactured and assembled. A significant object of the invention is to provide a fishing lure that can be completed without machining operations. Another object of this invention is to provide a freely twisting simulated minnow lure.

The essence of this invention is a simulated minnow lure, free turning and lifelike. The manufacturing essence of this invention is the simplification of the casting operation which is applicable to many other lures.

Depending upon the fish to be simulated, a free turning and lifelike simulation may be obtained by the same method.

DESCRIPTION OF DRAWINGS

FIG. 1 shows a side view of the lure.

FIG. 2 is a sectional view taken on line 2—2 in FIG. 4.

FIG. 3 is a sectional view taken on line 3—3 in FIG. 1.

FIG. 4 is a view of the insert.

Further objects and advantages of this invention will appear more clearly from the following description of a non-limiting illustrative embodiment and the accompanying drawings in which like numerals designate like parts throughout the several views.

DESCRIPTION OF TYPICAL EMBODIMENT

In the drawings a lure 10 embodying features of the invention is illustrated. An insert 18 having end holes 22 and center holes or bumps 20 is placed into the mold. No pins in the mold are required to locate the insert. If a groove is milled in the mold at the ends of the minnow shape, the insert will be properly positioned. Removal of the lure cast about the insert is quite easy and fast. The lure 10, typically of lead alloy, is cast about the insert 18, which may be of stainless steel providing strength and long life.

In designing a realistic model of a live minnow I have selected a perfectly symmetrical form in order to give the lure the balance necessary for horizontal and lateral stability. This is apparent the moment the lure strikes the water when it flattens out horizontally and begins to slowly descend spinning on its horizontal axis and wandering about like a falling leaf in simulating a crippled minnow. The uniform radius R in cross section through the entire length of the lure plus the dihedral angle of the tapered sides 11, 12 keeps the lure in perfect balance and very stable as it turns about its gravitational axis. The radius R of the curve of the arcuate sides is defined by the height C and thickness H of the body at midpoint according to the formula:

$$R = \frac{C^2 + 4H^2}{8H}.$$

Using lead alloys and stainless steel prevents corrosion and the necessity of adding extra weight on the line. This lure casts well, and is good for jigging and mooching and performs well in trolling.

The lure 10 has round ends 14, tapered sides 11, 12 laid out tangent to an imaginary circle 13. The minnow's head, eyes and gills are simulated by curves 17, circle 15 and line 16.

Since it is obvious that numerous changes and modifications can be made in the above-described details without departing from the spirit and nature of the invention, it is to be understood that all such changes and modifications are included within the scope of the invention.

What is claimed is:

1. A fishing lure simulating a minnow comprising a long, narrow, slightly tapered symmetrical arcuate body cast about an insert provided with holes for securing, said body having rounded ends and a uniform radius in cross-section, the body being symmetrically tapered in the longest direction about a lengthwise axis; and symmetrically tapered from a maximum dimension at the midpoint in the length towards the rounded ends.

2. In a fishing lure as in claim 1, the constant radius of the arcuate sides of the body defined by the height and thickness of the body at midpoint according to the formula:

$$\text{Radius} = \frac{(\text{height})^2 + 4 \times (\text{thickness})^2}{8 \times \text{thickness}}$$

3. In a fishing lure as in claim 1, the cast body comprising lead.

4. In a fishing lure as in claim 1, the insert comprising stainless steel.

* * * * *